(12) United States Patent
Suzuki et al.

(10) Patent No.: US 8,209,163 B2
(45) Date of Patent: Jun. 26, 2012

(54) GRAMMATICAL ELEMENT GENERATION IN MACHINE TRANSLATION

(75) Inventors: Hisami Suzuki, Redmond, WA (US); Kristina Toutanova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 11/504,285

(22) Filed: Aug. 15, 2006

(65) Prior Publication Data

US 2007/0282590 A1 Dec. 6, 2007

Related U.S. Application Data

(60) Provisional application No. 60/810,410, filed on Jun. 2, 2006.

(51) Int. Cl.
G06F 17/28 (2006.01)

(52) U.S. Cl. .................................. 704/2; 704/4; 704/5

(58) Field of Classification Search .............. 704/2, 8, 704/9, 4, 5
See application file for complete search history.

(56) References Cited

U.S. PATENT DOCUMENTS

| | | | | |
|---|---|---|---|---|
| 4,916,614 | A | | 4/1990 | Kaji et al. ........................... 704/2 |
| 5,406,480 | A | | 4/1995 | Kanno ............................. 704/10 |
| 5,425,129 | A | * | 6/1995 | Garman et al. ............... 704/256 |
| 5,671,425 | A | | 9/1997 | Suematsu ........................... 704/9 |
| 5,687,383 | A | | 11/1997 | Nakayama ..................... 395/752 |
| 5,696,980 | A | | 12/1997 | Brew ............................. 395/752 |
| 5,930,746 | A | * | 7/1999 | Ting ................................... 704/9 |
| 6,243,670 | B1 | | 6/2001 | Bessho et al. ...................... 704/9 |
| 6,289,302 | B1 | | 9/2001 | Kuo ................................... 704/2 |
| 6,473,729 | B1 | * | 10/2002 | Gastaldo et al. .................. 704/4 |
| 6,658,627 | B1 | | 12/2003 | Gallup .......................... 707/536 |
| 6,778,949 | B2 | | 8/2004 | Duan ................................ 704/2 |
| 7,318,022 | B2 | | 1/2008 | Li .................................. 704/10 |
| 7,672,829 | B2 | | 3/2010 | Ishikura | 
| 2002/0128819 | A1 | | 9/2002 | Jessee et al. ..................... 704/10 |
| 2002/0169592 | A1 | | 11/2002 | Aityan ............................. 704/7 |
| 2003/0004915 | A1 | | 1/2003 | Lin ................................. 704/10 |
| 2003/0023423 | A1 | | 1/2003 | Yamada et al. ................... 704/2 |
| 2003/0055626 | A1 | | 3/2003 | Miyahira .......................... 704/9 |
| 2003/0187644 | A1 | * | 10/2003 | Mohri et al. .................. 704/256 |
| 2003/0204400 | A1 | | 10/2003 | Marcu .............................. 704/7 |
| 2004/0193401 | A1 | | 9/2004 | Ringger et al. | 
| 2004/0205671 | A1 | | 10/2004 | Sukehiro ........................ 704/10 |
| 2005/0038643 | A1 | * | 2/2005 | Koehn ............................. 704/2 |
| 2005/0049851 | A1 | | 3/2005 | Watanabe ........................ 704/4 |
| 2006/0282255 | A1 | * | 12/2006 | Lu et al. ........................... 704/2 |
| 2007/0083357 | A1 | | 4/2007 | Moore et al. ..................... 704/4 |
| 2007/0282590 | A1 | | 12/2007 | Suzuki et al. |

OTHER PUBLICATIONS

Hajic et al. "Natural Language Generation in the Context of Machine Translation", Technical report, Center for Language and Speech Processing, Johns Hopkins University, 2002, Summer Workshop.*

Och et al. A Smorgasbord of Features for Statistical Machine Translation, NAACL, 2004.*

"Evaluation of a Japanese GFG Derived fro a Syntactically Annotated Corpus with Respect to Dependency Measures" by: Tomoya Noro et al., Tokyo pp. 9-16.

(Continued)

Primary Examiner — Jialong He
(74) Attorney, Agent, or Firm — Joseph R. Kelly; Westman, Champlin & Kelly, P.A.

(57) ABSTRACT

Grammatical element prediction is used in the context of machine translation. Features from both the source language and the target language sentences (or other text fragments) are used in predicting the grammatical elements.

15 Claims, 9 Drawing Sheets

OTHER PUBLICATIONS

"Inferring Attribute Grammars with Structured Data for Natural Language Processing" by: Bradford Starkie, Australia, 12 pages.

"A Paraphrase-Based Exploration of Cohesiveness Criteria" by: Inui Kentaro et al. Japan, 10 pages.

"A Hybrid Japanese Parser with Hand-crafted Grammar and Stattistics" by: Hiroshi Kanayama et al. Japan, 7 pages.

"Automated Postediting of Documents" by: Kevin Knight et al. 1994 6 pages.

"Memory-based Learning for Article Generation" In Proceedings of CoNLL-2000, p. 43-48, Libson, Portugal 2000 by: Guido Minnen et al. 6 pages.

"Automatic Article Restoration" by John Lee 2004 6 pages.

Toutanova, Effective Statistical Models for Syntactic and Semantic Disambiguation, http://npl.standford.edu/kristina/papers/thesis.pdf., Sep. 5, 2005, pp. 1-170, especially pp. 76-94.

U.S. Appl. No. 11/483,943, filed Jul. 10, 2006.

U.S. Appl. No. 11/483,943 Office Action mailed Oct. 2, 2008.

U.S. Appl. No. 11/483,943 Office Action mailed Apr. 21, 2009.

U.S. Appl. No. 11/483,943 Office Action mailed Sep. 28, 2009.

U.S. Appl. No. 11/483,943 Notice of Allowance mailed Mar. 9, 2010.

U.S. Appl. No. 11/483,943 Notice of Allowance mailed Sep. 20, 2010, 12 pages.

* cited by examiner

GRAMMATICAL ELEMENT GENERATION IN MACHINE TRANSLATION

The present application is based on and claims the benefit of U.S. provisional patent application Ser. No. 60/810,410, filed Jun. 2, 2006, the content of which is hereby incorporated by reference in its entirety.

BACKGROUND

Grammatical elements include function words, which are those words that do not have semantic meaning in a text fragment. An example of such function words are Japanese case markers, which indicate grammatical relations (such as subject, object, and location) of the complement noun phrase to the predicate. Other grammatical elements include inflections, such as inflections to indicate number, tense, gender, etc. For instance, the ending of the word "come" changes based on the number of the noun associated with it (i.e., I come, she comes).

Generation of grammatical elements using natural language processing technology has become an important technology. This is particularly true in the context of machine translation. In an English-to-Japanese machine translation system, for example, Japanese case markers are among the most difficult to generate appropriately. This is because the case markers often do not correspond to any word in the source language (i.e., in English), since many grammatical relations are expressed by word order in English.

Generating Japanese case markers is also difficult because the mapping between the case markers and the grammatical relations they express is very complex. For the same reasons, generation of case markers is challenging to foreign language learners.

Machine translation is the process by which a computer receives a text fragment in a source language, and translates it into a corresponding target language text fragment. Generation of grammatical elements has become an important component technology in the context of machine translation.

Statistical machine translation systems, however, have not yet successfully incorporated components that generate grammatical elements in the target language. State of the art statistical machine translation systems treat grammatical elements in exactly the same way as content words, and thus rely on phrasal translations and target language models to generate these elements. However, since these grammatical elements in the target language often correspond to long range dependencies or may not have any corresponding word in the source language (or both), the output of the statistical machine translation system is often not grammatically correct.

For example, Table 1 below shows an output from an English-to-Japanese statistical machine translation system on a sentence from a computer domain. The source sentence is labeled "S" and reads "The patch replaces the .dll file." The output is labeled "O" and includes three lines. The first line shows the Japanese characters, the second line is the phonetic spelling of the Japanese characters using the English alphabet, and the third line is the English translation. The correct translation is labeled "C" and includes the same three lines.

The conventional statistical machine translation system, trained on this domain, produces a natural lexical translation for the English word "patch" as "correction program", and translates "replace" into passive voice, which is more appropriate in Japanese. However, as can be seen from Table 1, the case marker assignment is problematic. The accusative marker "wo", which was output by the machine translation system, is completely inappropriate when the main verb is passive.

TABLE 1

S: The patch replaces the dll file.
O: 修正プログラムをdllファイルが置き換えられます。
shuusei purogurams-wo dll fairu-ga okikae-raremasu
correction program-ACC dll file-NOM replace-PASS
C: 修正プログラムで.dllファイルが置き換えられます。
shuusei purogurams-de .dll fairu-ga okikae-raremasu
correction program-with dll file-NOM replace-PASS This illustrates only a few difficulties in predicting Japanese case markers. Similar problems exist in generating other grammatical elements in machine translation.

The discussion above is merely provided for general background information and is not intended to be used as an aid in determining the scope of the claimed subject matter.

SUMMARY

Grammatical element prediction is used in the context of machine translation. Syntactic and other features from both the source language and the target language sentences (or other text fragments) are used in predicting the grammatical elements.

In one embodiment, an expansion and re-ranking approach is used to integrate a grammatical element prediction model into a statistical machine translation system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present invention can be used to predict and generate grammatical elements. For the sake of the present exemplary discussion, the grammatical elements being predicted are Japanese case markers. Of course, the present invention is not to be so limited and other grammatical elements could just as easily be predicted and generated as well (such as inflection for number, case, gender, etc.) as could these or other grammatical elements for many different languages, other than simply Japanese. However, again for the purpose of example only, the present discussion will proceed with respect to predicting and generating Japanese case markers as the grammatical elements under consideration.

Before describing the present invention in more detail, a brief discussion of Japanese case markers will be helpful. Conventionally, Japanese nominal postpositions are classified into the following three categories: case particles, conjunctive particles, and focus particles. Case particles, or case markers, indicate grammatical relations of the complement noun phrase to the predicate. As they are jointly determined by the noun phrase and the predicate, case markers do not allow simple mapping to a word in another language, which makes their generation more difficult for machine translation. The relationship between the case marker and the grammatical relation it indicates is not straightforward either. A case marker can (and often does) indicate multiple grammatical relations as in "Ainshutain-ni akogareru", which means "idolize Einstein" where "ni" marks the Object relation and in "Tokyo-ni sumu" which means "live in Tokyo" where "ni" indicates Location. Conversely, the same grammatical relation may be indicated by different case markers. Both "ni" and "de" in "Tokyo-ni sumu" (live in Tokyo) and "Tokyo-de au" (meet in Tokyo) indicate the Location relation.

Ten case markers are used as a primary and exemplary target of the prediction task discussed herein. Those ten case markers are shown in the first ten lines of Table 2 below.

TABLE 2

| case markers | | grammatical functions | +wa |
|---|---|---|---|
| が | ga | subject; object | |
| を | wo | object; path | |
| の | no | genitive; subject | |
| に | ni | dative object, location | ✓ |
| から | kara | Source | ✓ |
| と | to | quotative, reciprocal, as | ✓ |
| で | de | location, instrument, cause | ✓ |
| へ | e | goal, direction | ✓ |
| まで | made | goal (up to, until) | ✓ |
| より | yori | source, comparison target | ✓ |
| は | wa | Topic | |

Focus particles add focus to a phrase against a given background or contextual knowledge. For example, "shika" and "mo" are used in "pasuta-shika tabenakatta" which means "ate only pasta" and "pasuta-mo tabeta" which means "also ate pasta". The focus particles correspond to "only" and "also", respectively. It will be noted that focus particles often replace case markers. In the above two examples, the object marker "wo" is no longer present when "shika" or "mo" is used.

For purposes of the present exemplary discussion, the only focus particle predicted is the topic marker "wa". Unlike other focus particles, such as "shika" and "mo", "wa" does not translate into any word in English, which makes it difficult to generate by using information from the source language. The main function of "wa" is to introduce a topic in the sentence, which is to some extent predictable from the structure of the sentence itself.

Therefore, in one exemplary embodiment, in addition to the ten true case markers set out in Table 2 above, the term "wa" is also included as a case marker. In addition, the combination of case particles plus "wa" is also included as a secondary target of prediction. The case markers that can appear followed by "wa" are indicated by a check mark in the column "+wa" in Table 2. Thus, there are seven secondary prediction targets: "niwa", "karawa", "towa", "dewa", "ewa", "madewa", and "yoriwa". Therefore, for purposes of the present example, there are a total of eighteen case particles to assign to phrases. Further, where a phrase does not have case, a value of NONE is assigned.

Conjunctive particles are used to conjoin words and phrases, corresponding to English "and" and "or". It will be noted, of course, that the present system can be extended to include conjunctive particles as well as other focus particles (other than "wa"), but for the sake of the present example, these are not included as prediction targets.

The case marker generation task is, then, to predict a given case marker for each phrase (or, in Japanese, "bunsetsu", which is defined as one content word plus any number of function words) in a Japanese translation of an English language phrase, or to predict that no case markers are to be assigned (i.e., NONE), which means that the phrase does not have case.

Figure 1:
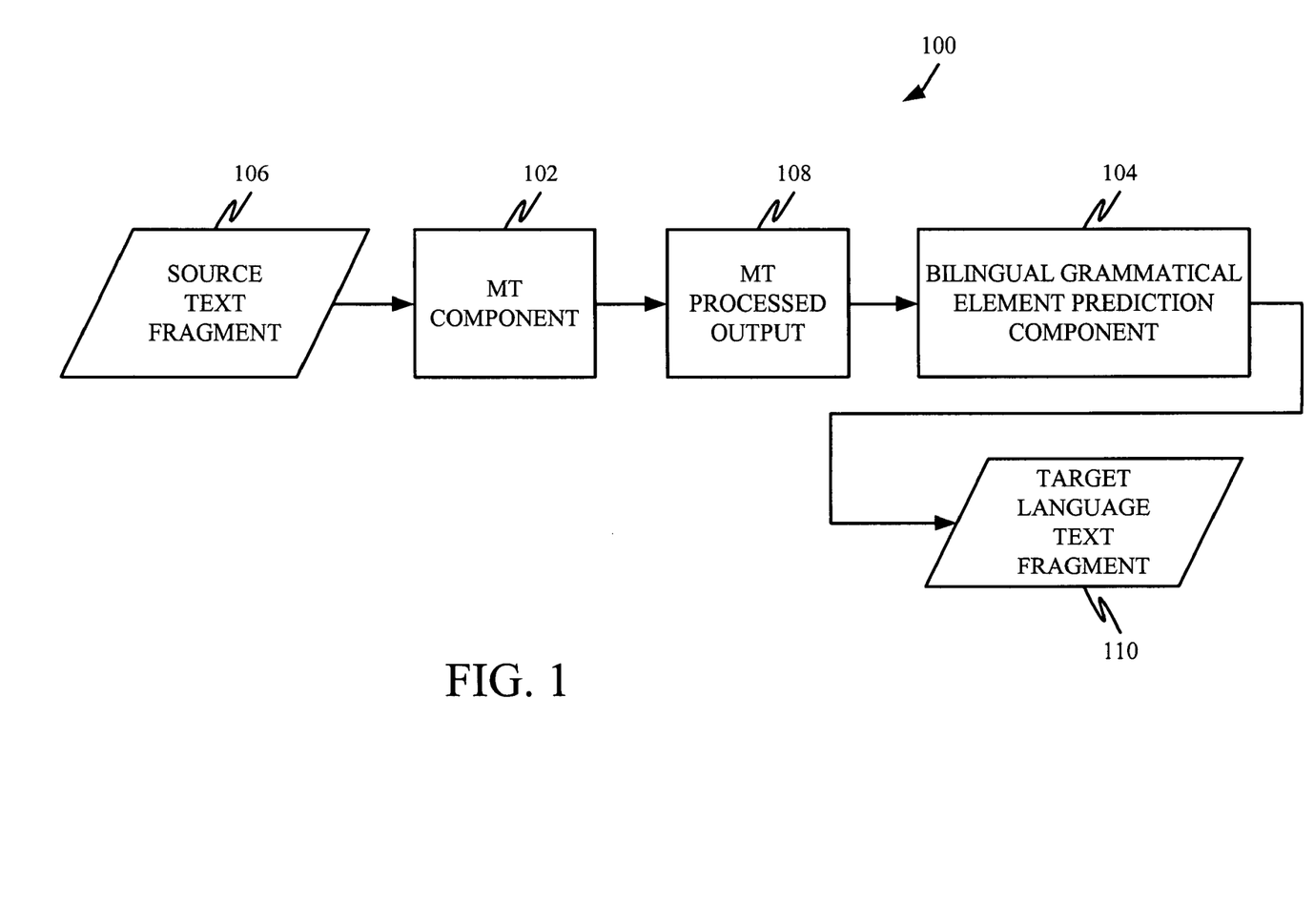
FIG. 1 is a block diagram of one embodiment of a grammatical element prediction system.

FIG. 1 is a block diagram of a grammatical element prediction system 100. System 100 includes machine translation processing component 102 and bi-lingual grammatical element prediction component 104. The present system will be described in the context of translating an English source sentence into a Japanese target sentence. Of course, any other language could be used as well, as could any other text fragment (such as a phrase) and the English-to-Japanese translation of sentences is discussed for the sake of example only.

Figure 2:
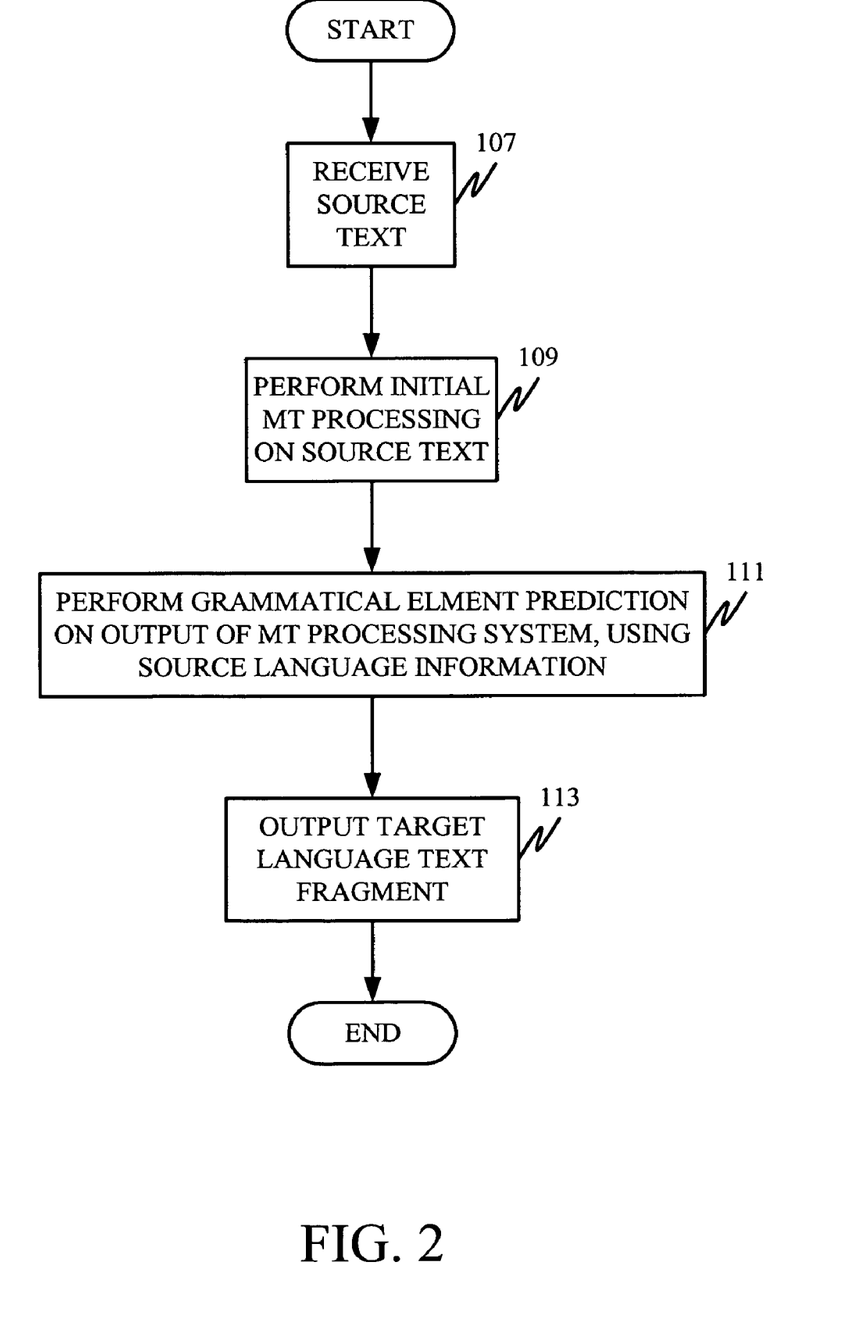
FIG. 2 is a flow diagram illustrating one embodiment of the operation of the system shown in FIG. 1.

FIG. 2 is a flow diagram showing one embodiment of the overall operation of system 100 shown in FIG. 1. FIGS. 1 and 2 will now be discussed in conjunction with one another.

In general, system 100 operates by receiving a source text fragment 106 (such as an English sentence). This is indicated by block 107 in FIG. 2. Machine translation processing component 102 then performs some machine translation processing operations on source text fragment 106.

The extent of the machine translation operations can vary with various embodiments. In any case, the output of system 102 is a machine translation processed output 108. In one illustrative embodiment, output 108 is simply a Japanese sentence without case markers. In another embodiment, output 108 is a word-aligned set of source and target text fragments with an imposed dependency structure. By "word-aligned", it is meant that the source and target language text fragments are output along with an indication of which words or groups of words in the target text fragment are translations of which words or groups of words are in the source text fragment. An exemplary "imposed dependency structure" is generated by receiving a syntactic or semantic parse of the source text fragment 106 and projecting dependency relations from the parse onto the target language text fragment in output 108 through word alignment. Of course, other or different outputs 108 can be used, as will be discussed below. Performing machine translation operations on source text fragment 106 is indicated by block 109 in FIG. 2. Grammatical element prediction component 104 then breaks the output 108 into phrases and determines whether case is to be assigned to each target phrase. If so, component 104 predicts and assigns case to the target phrase. This is indicated by block 111 in FIG. 2.

In one embodiment, discussed in more detail below with respect to FIG. 8, component 104 expands the hypotheses in output 108 with grammatical variants and re-ranks the n-best expanded hypotheses. Of course, component 104 can assign case markers in other ways, such as by simply assigning them to the best hypothesis, by assigning them to n-best hypotheses without expanding or re-ranking, etc.

In any case, the output of component 104 is illustratively one or more target language text fragment hypotheses 110 with grammatical elements (e.g., case markers) assigned. Of course, the output 110 can also be more rich, such as an aligned source and target language structure with various dependencies or other syntactic or semantic elements labeled, etc. For the sake of discussion, however, this embodiment simply outputs one or more translation hypotheses with case markers assigned. Outputting the target language text fragment 110 is indicated by block 113 in FIG. 2. It will be noted that this can be done in two steps (i.e., determining whether case is to be assigned, and, if so, assigning case) or in a single step.

Figure 3:
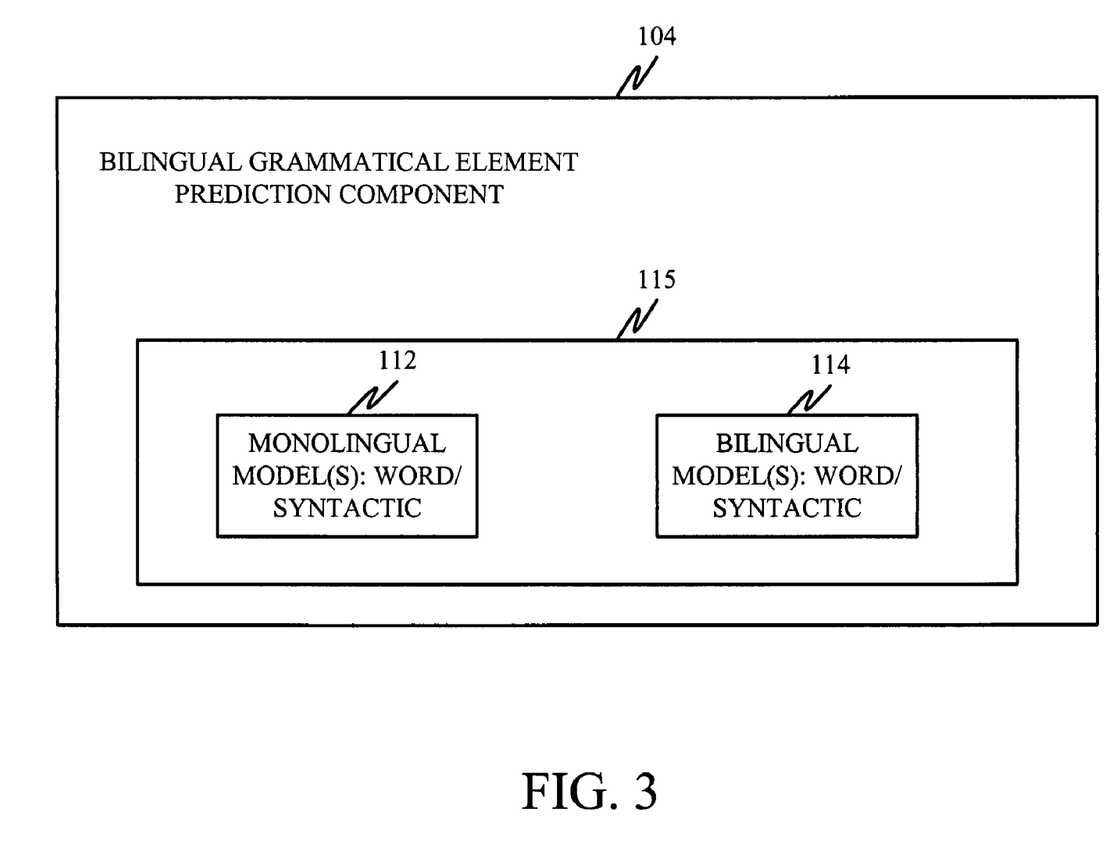
FIG. 3 is a more detailed block diagram of a bilingual grammatical element prediction component.

FIG. 3 is a more detailed block diagram of bilingual grammatical element prediction component 104. Component 104 illustratively includes one or more monolingual models 112 as well as one or more bilingual models 114.

Figure 4:
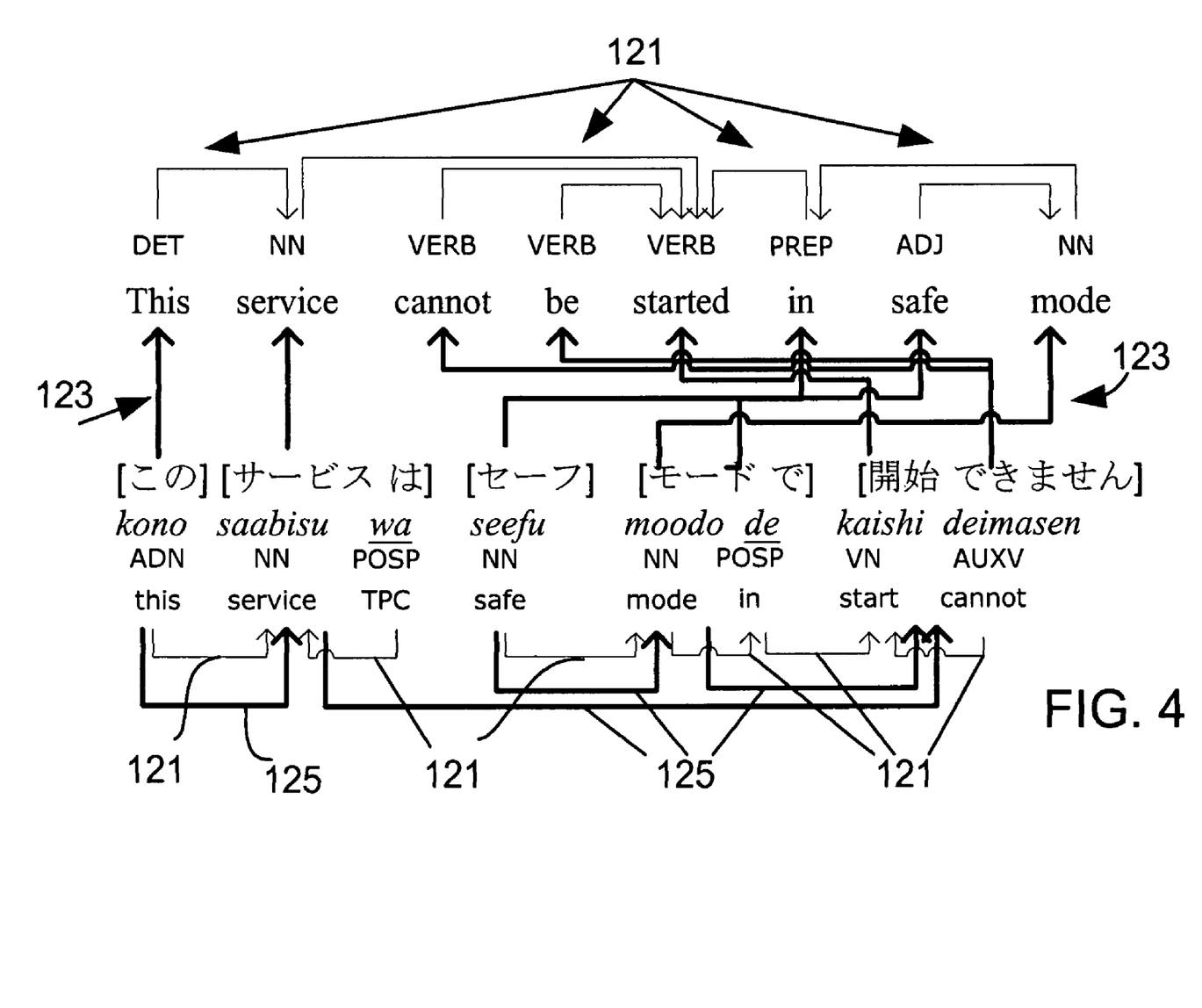
FIG. 4 illustrates dependencies in a source language text fragment, a corresponding target language text fragment, and alignment between source and target words.

In one illustrative embodiment, models 112 and 114 are statistical models that are trained using parallel sentence pairs of English source sentences and Japanese translations. FIG. 4 shows one example of such a parallel sentence pair. On the source side (in this example, the English language side) part-of-speech (POS) tags and word dependency structures are assigned. The word dependency structure is indicated by the solid arcs 121 in FIG. 4. The alignments between the English and Japanese words in the sentences are indicated by the lines 123. Because phrases ("bunsetsus") are the appropriate units for case marker assignment, the Japanese sentences are also parsed into bunsetsus and phrase-level dependency structures are illustratively created for them.

The phrase-level dependency structures are created by first tagging the sentence using an automatic tagger with a set of POS tags, and using the POS tags to parse the words into phrases (or bunsetsus). The phrase-level dependency structure is constructed by performing a breath-first traversal of the word dependency structure projected from English. The phrase-level dependencies are indicated by the bold arcs 125 in FIG. 4. Each phrase has a single case marker or an indication "NONE". The correct case markers are "wa" and "de" for the second and fourth phrases (underlined in FIG. 4), and "NONE" for the other phrase (indicating that no case marker is to be assigned).

In one illustrative embodiment, models 112 and 114 are log-linear models that are trained to predict a case marker for each bunsetsu given a set of features which are described below. Log-linear models produce probability distributions which can be used for an easy integration with a statistical machine translation system. Of course, other models could be used as well.

In one illustrative embodiment, models 112 and 114 assign a probability distribution over case marker assignments given a source (English) sentence, all non-case marker words of a candidate (Japanese) translation, and additional annotation information. In one embodiment, monolingual models 112 are generated that do not use any information from the source text fragment (i.e., the English sentence). Bilingual models 114 use information from the source and target text fragment or only from the source text fragment. Of course, models 112 and 114 can be combined into a single model (represented by line 115) in FIG. 3. In either case, Table 3 shows features used in monolingual model 112 and bilingual model 114 (or combined model 115), along with examples of those features.

In addition, various feature combinations for the models can be used as well. The features shown in Table 3 are features for a phrase, for its parent phrase, and for their relations as well as word n-gram-based features. Also, a direction feature (with values left and right) and an alternative parent feature are shown. The alternative parent feature indicates all words which are the parents of any word in the phrase, according to a word-based dependency tree, with the constraint that case markers cannot be alternative parents. This feature captures the information that is potentially lost in the process of building a phrase dependency structure from word dependency information in the target language.

TABLE 3

| Feature | Example |
|---------|---------|
| Monolingual features | |
| Head word/POS | saabisu/NN |
| Previous n words/POS | kono/AND |
| Next n words/POS | seefu/NN |
| Previous head word/POS | kono/AND |
| Next head word/POS | seefu/NN |
| Parent head word/POS | kaishi/VN |
| Distance | 1left |
| Bilingual features | |
| Word/POS of source words aligned to the head of the phrase | service/NN |
| Word/POS of all source words aligned to any word in the phrase | service/NN |
| Word/POS of all source words aligned to the head word of the parent phrase | started/VERB |
| Word/POS of parent of source word aligned to any word in the phrase | started/VERB |
| Aligned Subcat | NN-c, VERB, VERB, VERB-h, PREP |
| Aligned Distance | 2left |

It can be seen that the bottom half of Table 3 shows bilingual features (in this case, all are based on the source language text fragment) The features of the source sentence are obtained through word alignments. Features from the source words aligned to the head of the phrase, to the head of the parent phrase, or to any alternative parents, are created. If any word in the phrase is aligned to a preposition in the source language, the model can use that information as a feature as well.

In addition to word features and POS-features for aligned source words, the model also refers to the dependency between the phrase and its parent phrase in the English source. For instance, if the head of the Japanese phrase is aligned to a single word $s_1$, and the head of its parent phrase is aligned to a single source word $s_2$, then the relationship between $s_1$ and $s_2$ is extracted and subcategorization, direction, distance and number of sibling features are defined, in order to capture the grammatical relation in the source. This can be more reliable than in the projected target dependency structure.

It should be noted that where separate monolingual models 112 and bilingual models 114 are used, they will be trained using the monolingual and bilingual features shown in Table 3. In one embodiment, the monolingual models 112 are trained using the monolingual features and the bilingual models 114 are trained using both the monolingual and bilingual features, or using only the bilingual features. Of course, where the models are combined into a single model, that single model (represented by 115 in FIG. 3) will be trained using both the monolingual and bilingual features.

Both the monolingual and bilingual features in Table 3 can be divided into word features (which are based only on word lemmas) and syntactic features (which use structural information such as POS tags and dependency links). In one embodiment, of course, models can be built with and without syntactic features. Therefore, in one embodiment, there are four different types of models: monolingual word models (that do not use syntactic information), monolingual syntactic models (which do use such information), bilingual word models and bilingual syntactic models. Given a source English sentence and its Japanese translation which does not include case markers, these models are used to predict all case markers in the Japanese sentence.

It should also be noted that modules 112 and 114 can include local models that predict case markers based on each phrase independently of case markers in other phrases. They could also, however, include joint models that predict case markers on a phrase based on case markers predicted on other phrases. Joint models can use features indicative of sequences of case markers on sister phrases, and repetitions of case markers predicted for sister phrases (phrases that modify a same head phrase). Other features, or different ones can be used.

Figure 5:
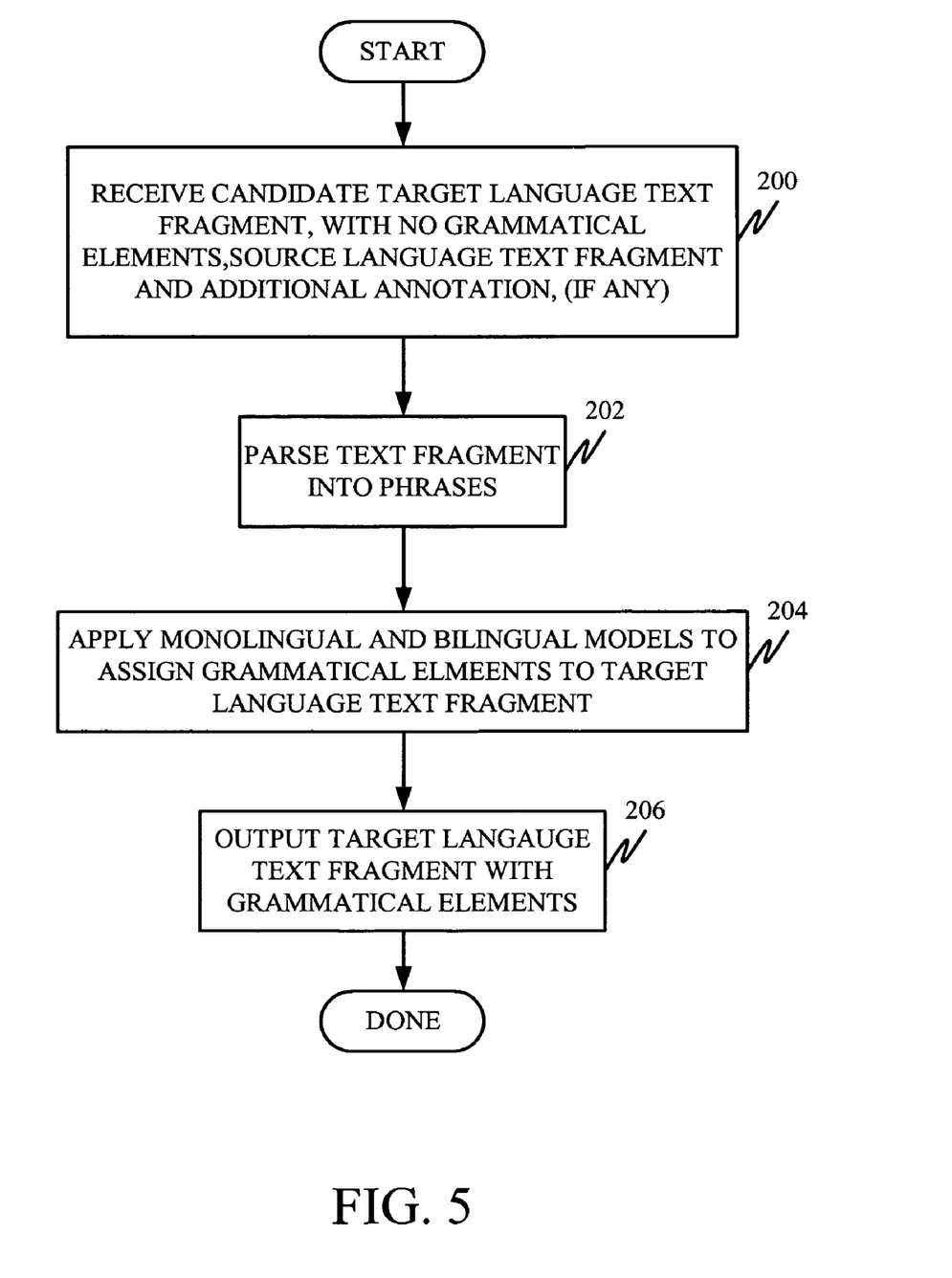
FIG. 5 is a flow diagram illustrating grammatical element assignment in more detail.

FIG. 5 is a more detailed flow diagram illustrating how this is accomplished in accordance with one embodiment.

Bilingual grammatical element prediction component 104 first receives the candidate target language text fragment either with no grammatical elements predicted, or with initial grammatical elements predicted by machine translation component 252 (it will be noted that if the initial grammatical elements are predicted, this can be used as a feature as well) along with the source language text fragment and additional annotations (such as semantic annotations), if any. This is received as the machine translation processed output 108 (shown in FIG. 1) and is indicated by block 200 in FIG. 5. If the target language text fragment is larger than a phrase, in one embodiment, it is parsed into phrases. This is indicated by block 202 in FIG. 5.

Component 104 then applies both monolingual and bilingual models 112 and 114, respectively, (or the single model 115) to assign grammatical elements to the target language text fragment. This is indicated by block 204 in FIG. 5. This can be done, for example, by expanding translation hypotheses and re-ranking them as described below. Thus, component 104 not only considers information in the target language text fragment, in order to predict case (or assign grammatical elements), but it also uses information in the source language text fragment, which was used to generate the target language text fragment.

Once the grammatical elements have been predicted and assigned, component 104 outputs the target language text fragment, along with the assigned grammatical elements. This is indicated by block 206 in FIG. 5. It will also be noted, of course, that component 104 optionally can output additional information, such as the original source language text fragments, alignments between the source and target language structure, and any other desired annotations as well.

Figure 6:
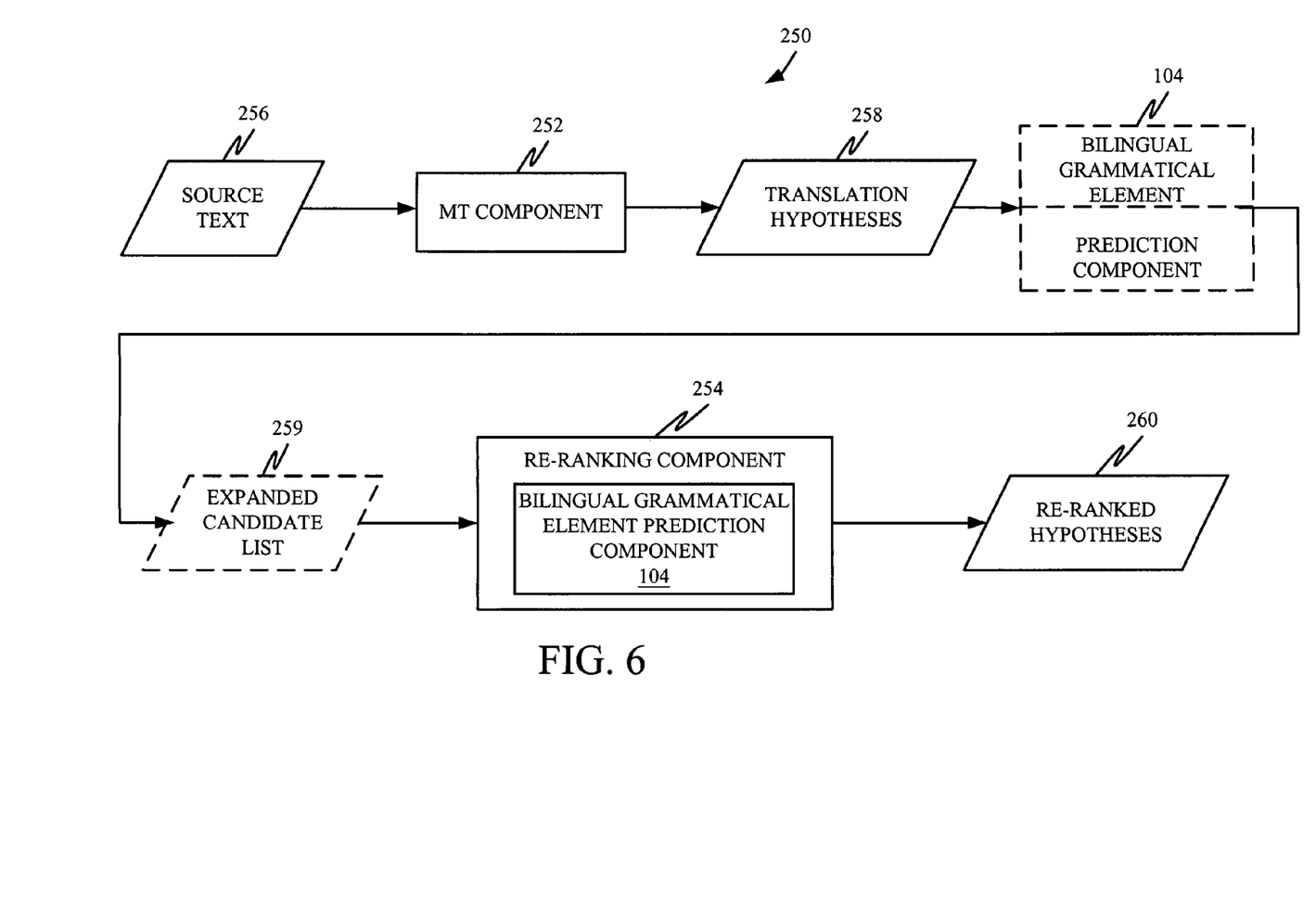
FIG. 6 is a block diagram of one embodiment of a machine translation system with grammatical element predication.

FIG. 6 illustrates bilingual grammatical element prediction component 104 integrated into an end-to-end machine translation system 250 in accordance with one embodiment. End-to-end machine translation system 250 includes machine translation component 252 (which can be similar to component 102 shown in FIG. 1). Machine translation system 250 also illustratively includes re-ranking component 254. In one embodiment, component 104 is shown as part of re-ranking component 254. In another embodiment, the two are separate (as illustrated in phantom in FIG. 6). Both embodiments are described below.

It is possible to integrate grammatical element prediction component 104 into the overall machine translation system 250 very tightly by, for example, using only local features and incorporating the probability distributions of the grammatical element prediction component 104 in phrase translation probabilities of machine translation 252. However, grammatical element prediction component 104 can also be used to re-rank the translation hypotheses generated by machine translation component 252. One advantage of the re-ranking approach is that it allows grammatical element prediction component 104 to use global information which would otherwise be difficult to integrate during the search for translation hypotheses. Since grammatical element prediction (such as case marking) decisions often reflect long-range dependencies, incorporating component 104 into re-ranking allows system 250 to use the knowledge of these long-range dependencies captured by system 104.

Figure 7:
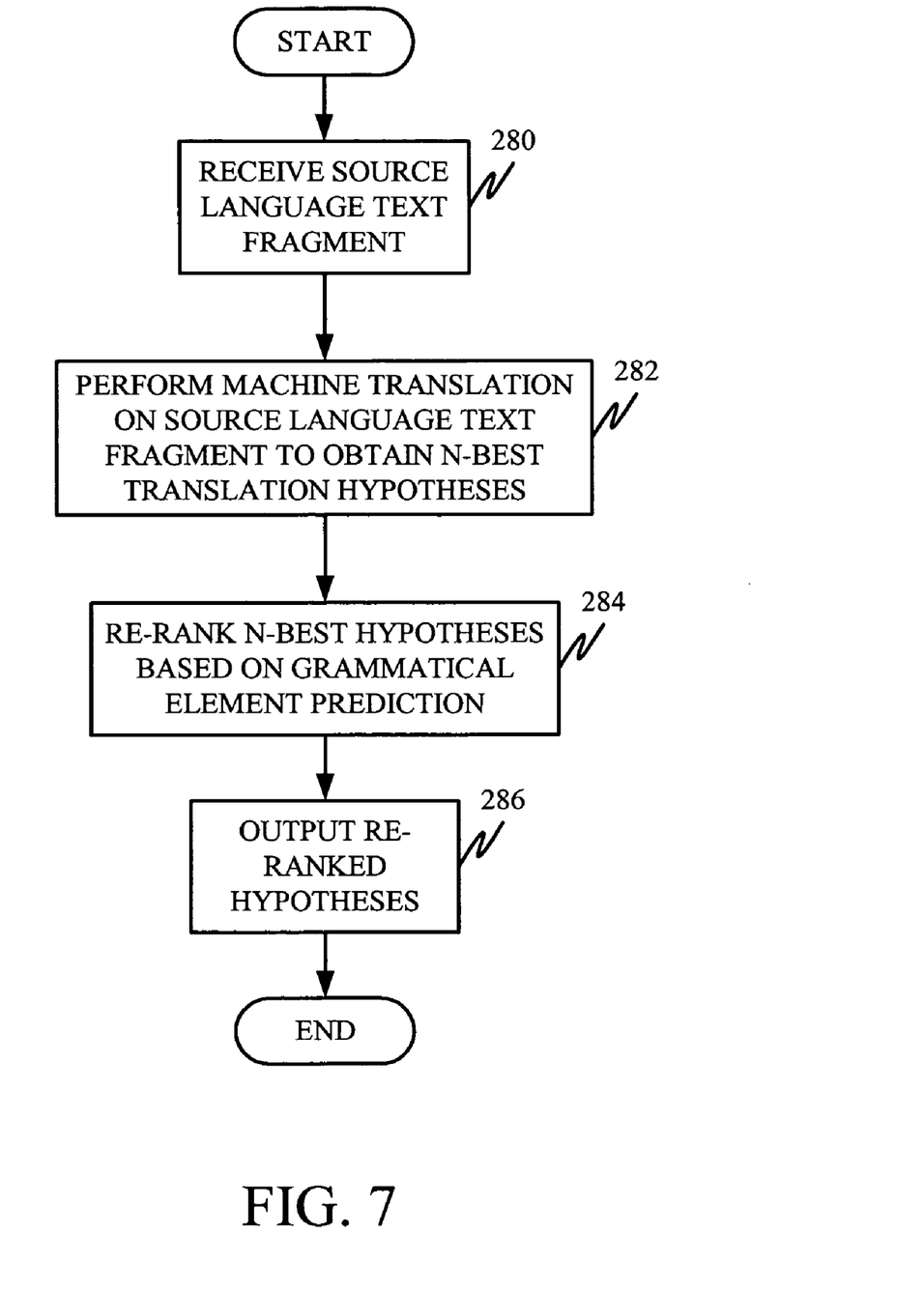
FIGS. 7 and 8 are flow diagrams illustrating embodiments of the operation of the system shown in FIG. 6.

FIG. 7 is a flow diagram that illustrates an n-best re-ranking approach. In the approach shown in FIG. 6 and described with respect to FIG. 7, machine translation component 252 first receives the source language text fragment 256. This is indicated by block 280 in FIG. 7. Machine translation component 252 then performs machine translation on the source language text fragment 256 in order to generate n-best translation hypotheses 258. This is indicated by block 282 in FIG. 7. Of course, in generating the n-best translation hypotheses 258, machine translation component 252 may attempt to assign or predict grammatical elements for each of the hypotheses. In another embodiment, grammatical element prediction component 104 is used to assign case markers to each of the Japanese translations in the n-best Japanese translation hypotheses generated by machine translation component 252.

Re-ranking component 254 then uses the grammatical elements predicted by component 104 in re-ranking the translation hypotheses 258. This is indicated by block 284 in FIG. 7. In one illustrative embodiment, the output of component 104 is used as a feature in re-ranking the top n candidates output by machine translation component 252. In the illustrative embodiment in which Japanese case markers are being assigned, the value of the case marking feature is the log-probability of the case assignment of the candidate hypothesis according to component 104. The log-probability can be readily evaluated for a candidate translation hypothesis 258 and its corresponding source sentence, because the additional annotations (such as those shown in FIG. 4) can be reconstructed using the output of the machine translation component 252.

In one illustrative embodiment, the baseline machine translation component 252 (without component 104) is based on a linear model that weighs the values of multiple feature functions. In one illustrative embodiment, the model uses a number of different feature functions, such as a phrase translation model, a target translation model, a word count model, and a phrase count model. The model assigning a score to each candidate translation has the form:

$$\text{score}(t) = \sum_j \lambda_j f_j(t) \qquad \text{Eq. 1}$$

Where $\lambda_j$ are the model parameters and $f_j(t)$ is the value of the feature function j on the translation candidate t. The model chooses, for each source sentence, the candidate translation that has the highest score. Thus, while re-ranking can be performed by a separate re-ranking component 254, it can also be performed simply by changing the baseline machine translation component 252 to add an additional feature function (i.e., the case assignment score) and to retrain the parameter values $\lambda_j$. In any case, the re-ranked hypotheses 260 are output. This is indicated by block 286 in FIG. 7.

Figure 8:
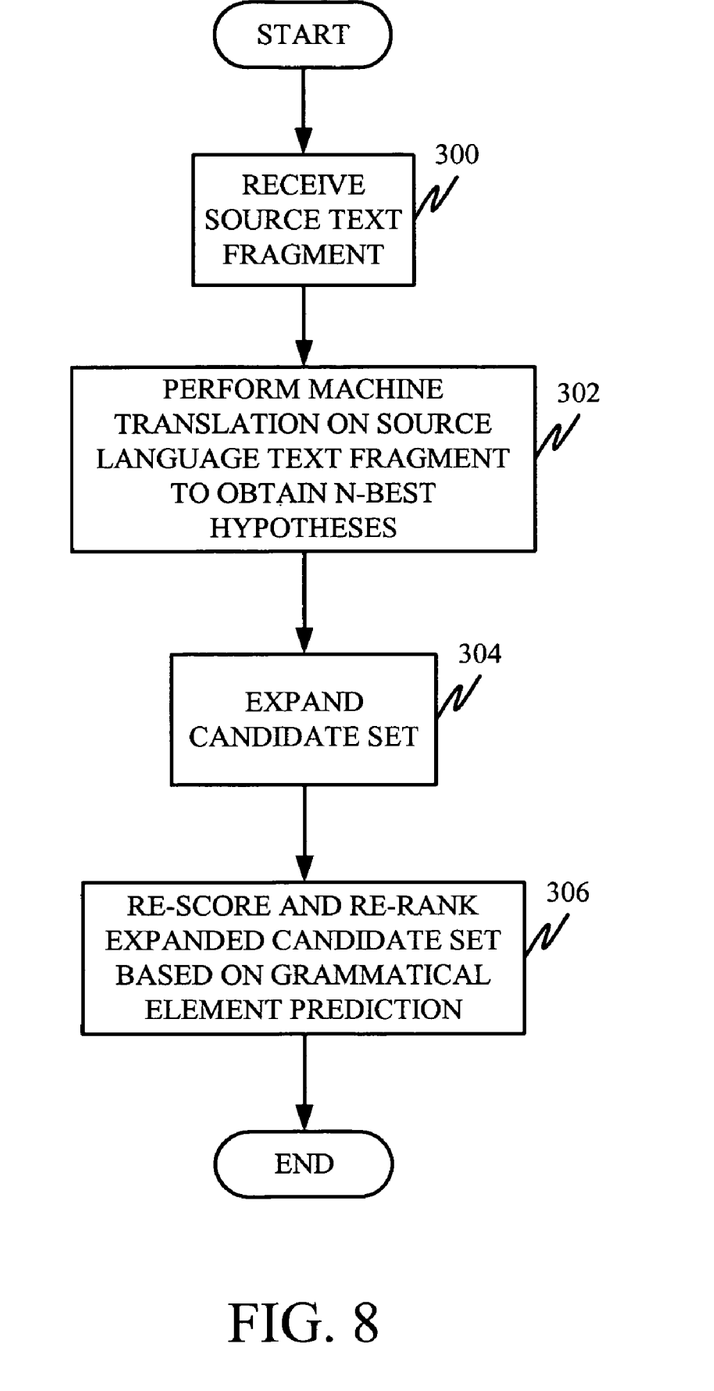

FIG. 8 is a flow diagram of another illustrative embodiment of integrating bilingual grammatical element prediction component 104 into an end-to-end machine translation system 250. In the embodiment described above with respect to FIG. 7, there may not exist many variants of the same hypothesis differing only in case assignment. If that is true, then it may be difficult to choose a hypothesis 258 with a good case assignment. Therefore, it may be advantageous to consider more translation candidates, and to consider different case marking variations. FIG. 8 illustrates a flow diagram for such a system.

Component 252 first receives the source text fragment 256. This is indicated by block 300 in FIG. 8. Machine translation component 252, then performs machine translation on the source language text fragment 256 to obtain n-best hypotheses 258. This is indicated by block 302 in FIG. 8. Component 104 then expands the candidate set of translation hypotheses 258 to obtain an expanded set of hypotheses 259. This is indicated by block 304.

In one illustrative embodiment, to expand the candidate set, for each translation hypothesis t in the n-best list of translation hypotheses 258 generated by machine translation component 252, case assignment variations of translation t are generated. It may be computationally expensive to consider all case assignment variations. Therefore, in accordance with one embodiment, only the top k case assignments generated by grammatical element prediction component 104 are considered, where $1 \leq k \leq 10$. Thus, component 104 expands hypotheses 258 to include the top k case assignment variations for each translation t in the n-best list 258 output by machine translation component 252.

Once this expanded set of translation candidates 259 is generated, the expanded set of translation candidates 259 is re-scored and re-ranked by re-ranking component 254. This is indicated by block 306 in FIG. 8. It will be noted that component 104 can be part of component 254 or they can be separate. In one illustrative embodiment, component 254 computes feature functions for all candidates and trains a linear model that chooses from the expanded candidate set. While some features, such as word count features, are easy to recompute for the new candidate set, other features (such as phrase translation probability) are more difficult to recompute. Thus, in one embodiment, only two features previously considered by machine translation component 252 are recomputed. Those features include a language model feature and a word count feature. The language model feature is illustratively a language model score for the translation hypothesis, and the word count feature is illustratively a model score that models variations in word count from the translation of the source language text fragment to the target language text fragment. The other features of machine translation component 252 are assumed to have the same value for each of the different case variations.

In addition, in one illustrative embodiment, in re-scoring the expanded candidate set of hypotheses, several additional features are used. These features are aimed at better modeling the case assignment quality for the various translation hypotheses (i.e., the accuracy of the case assignments in the various translation hypotheses). Such features can include, for example, a word-for-word translation score in translating the source language text fragment (word-for-word) into the target language text fragment; a reverse word-for-word score (translating the target language text fragment into the source language text fragment); a binary feature with a value of 0 for original baseline system candidates and a value of 1 for newly generated candidates; a count of case markers that were changed from a value of NONE (meaning that no case was assigned to the phrase) to any other value relative to phrases in the original translation candidate; a count of case markers that were changed from any other value to NONE with respect to phrases in the original translation candidate; and a count of case markers changed from any non-NONE value to another non-NONE value with respect to the original translation candidate. The re-scored and re-ranked, expanded candidate set is then output as hypotheses 260.

It can thus be seen that in one embodiment both monolingual and bilingual features are incorporated into a grammatical element prediction component. Therefore, information from the source language text fragment is considered along with information from the target language text fragment, in predicting grammatical elements. In another embodiment, the grammatical element prediction component is incorporated into an end-to-end machine translation system. This not only helps to improve the machine translation system in selecting a correct hypothesis, but it also increases the fluency of the selected hypotheses by assigning proper grammatical elements.

Figure 9:
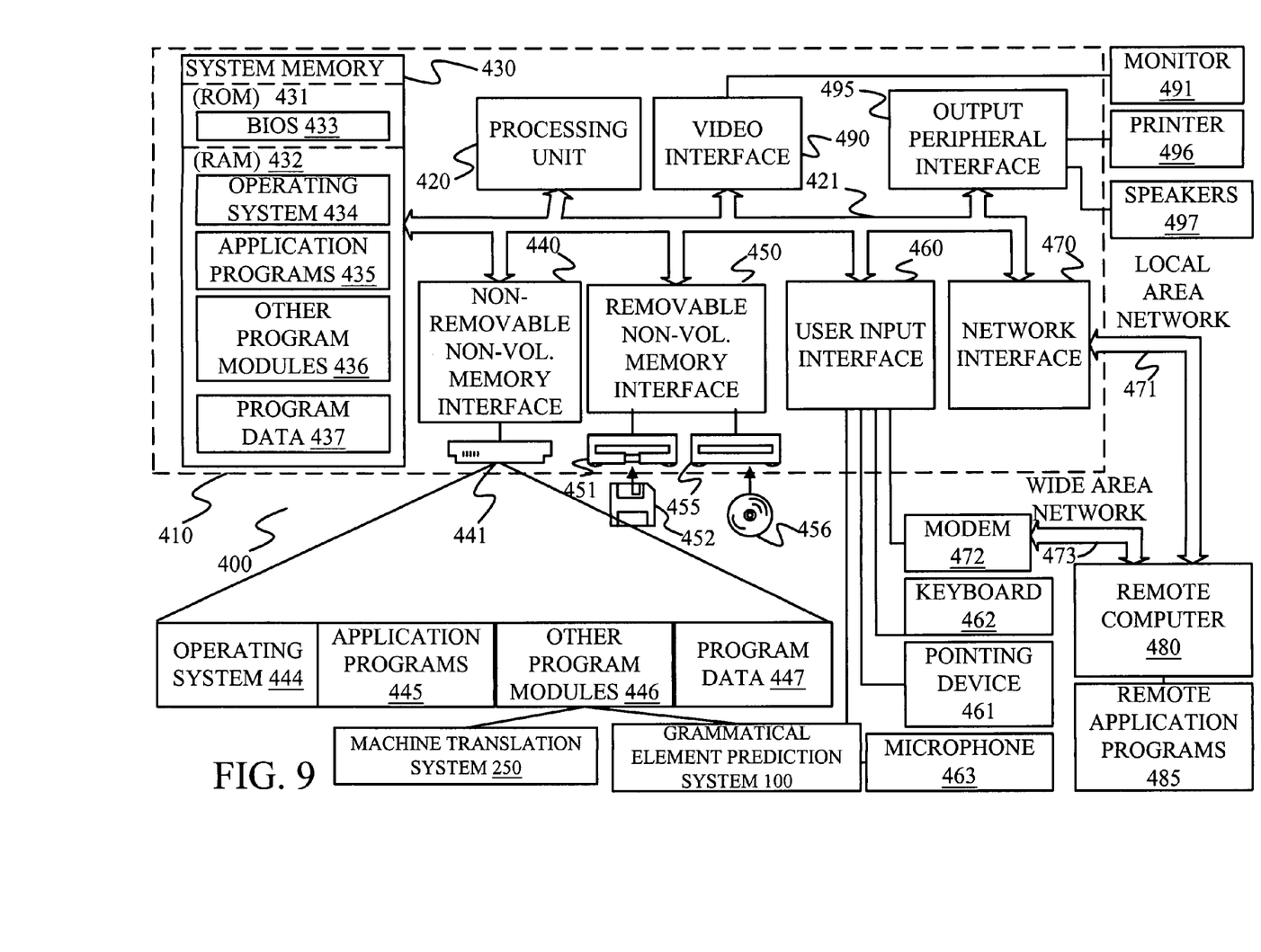
FIG. 9 is a block diagram of one computing environment in which some embodiments may be practiced.

FIG. 9 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

The bilingual grammatical element predication component 104 can be stored by itself for use by the computing device shown in FIG. 9 or it can be stored as part of machine translation system 250 or grammatical element predication system 100, both of which are shown in FIG. 9. The systems are shown stored in other program modules 446 (described below), but they could be stored in other places as well. Further, they could be stored on remote computer 480 for use over network 473 or 471.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 9, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 9 illustrates operating system 434, application programs 435, other program modules 436, and program data 437.

The computer 410 may also include other removable/non-removable volatile/nonvolatile computer storage media. By way of example only, FIG. 9 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 9, provide storage of computer readable instructions, data structures, program modules and other data for the computer 410. In FIG. 9, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 9 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 172, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 9 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A machine translation system, comprising:
a translation component receiving a textual input in a first language and generating a textual translation hypothesis in a second language;
a grammatical element prediction component coupled to the translation component to receive the translation hypothesis and information corresponding to the textual input and, thereafter, the grammatical element prediction component identifying phrases in the translation hypothesis and assigning scores to possible grammatical elements for each phrase, the possible grammatical elements including at least one of function words, case markers, and inflections, and the grammatical element prediction component assigning the possible grammatical elements to each phrase in the translation hypothesis based on words in the translation hypothesis and the information corresponding to the textual input, wherein the grammatical element prediction component comprises at least one statistical model trained to assign the scores to the possible grammatical elements and wherein the prediction component determines whether a given phrase has a predicted grammatical element, the grammatical elements prediction component assigning the scores based on both monolingual features of the second language and bilingual features of the first and second languages;
a re-ranking component generating a plurality of additional textual translation hypotheses by, after the translation component generates the textual translation hypothesis, varying only the grammatical elements assigned to the textual translation hypothesis using the grammatical element prediction component and generating a rank ordered set of textual translation hypotheses based on accuracy features indicative of an accuracy of the grammatical elements assigned to each of the textual translation hypothesis and the additional textual translation hypotheses, wherein the accuracy features include a count of the words without semantic meaning added to each of the additional textual translation hypotheses; and
a computer processor, being a functional part of the machine translation system, and activated by the grammatical element prediction component to facilitate assigning scores to the possible grammatical elements.

2. The machine translation system of claim 1 wherein the textual input includes dependency information indicative of dependency relations among words in the textual input.

3. The machine translation system of claim 2 wherein the grammatical element prediction component assigns grammatical elements to the translation hypothesis based on the dependency information in the textual input.

4. The machine translation system of claim 1 wherein the translation component generates a plurality of rank ordered translation hypotheses and wherein the re-ranking component re-ranks the plurality of rank ordered translation hypotheses based on the grammatical elements assigned to each hypothesis.

5. The machine translation system of claim 4 wherein the re-ranking component re-ranks the plurality of rank ordered hypotheses based on grammatical element predication quality features indicative of an accuracy of grammatical elements assigned.

6. The machine translation system of claim 4 wherein the re-ranking component generates the plurality additional textual of translation hypotheses by varying the grammatical elements assigned to each of the first plurality of rank ordered translation hypotheses.

7. A computer implemented method of assigning grammatical elements using a computer with a processor; comprising:
performing, with the processor, machine translation on a source language text fragment to obtain a target language text fragment;
receiving the target language text fragment generated from the source language text fragment;
after the target language text fragment is received, accessing, with the processor, a statistical grammatical element prediction model to assign grammatical elements, comprising words without semantic meaning, to the target language text fragment to obtain a first form of the target language text fragment that includes assigned grammatical elements, the statistical grammatical element prediction model predicting grammatical elements for portions of the target language text fragment using both monolingual features of the target language and bilingual features of both the source language and the target language;
generating additional forms of the target language text fragment by using the statistical grammatical element prediction model to vary only grammatical elements assigned to the target language text fragment received; and
ranking the first form and additional forms of the target language text fragment based on an accuracy measure indicative of an accuracy of the grammatical elements assigned to the first form and the additional forms, wherein the accuracy measure includes a count of the words without semantic meaning added to each of the additional forms.

8. The method of claim 7 wherein the source language text fragment includes a source parse tree from a natural language parse of the source language text fragment, and wherein assigning grammatical elements comprises:
assigning the grammatical elements to the target language text fragment based on information in the source parse tree.

9. The method of claim 8 and further comprising projecting dependencies from the source parse tree to the target language text fragment.

10. The method of claim 9 wherein assigning the grammatical elements comprises:
assigning the grammatical elements to the target language text fragment based on the dependencies projected from the source parse tree.

11. A computer implemented method of performing machine translation, comprising:
receiving a source language text fragment;
applying, with a computer processor, one or more statistical machine translation models to the source language text fragment to obtain a target language text fragment that is a translation of the source language text fragment, and after obtaining the target language text fragment, applying one or more statistical machine translation models to the target language text fragment, including a statistical bilingual grammatical element assignment model, to assign grammatical elements to the target language text fragment based on features in the source language text fragment and based on features in the target language text fragment to obtain an output hypothesis, wherein the grammatical elements comprise words, or inflections, without semantic meaning;

using the grammatical element assignment model to generate additional output hypotheses by assigning varied grammatical elements to the output hypothesis so the additional output hypotheses differ from the output hypothesis only in the assigned grammatical elements; and ranking the output hypothesis and additional output hypotheses based on one or more translation metrics, wherein the translation metrics include a count of the words or inflections without semantic meaning added to each of the additional output hypotheses.

12. The method of claim 11 wherein applying the one or more statistical machine translation models comprises:

generating a plurality of translation hypotheses; and assigning grammatical elements to the translation hypotheses based on information in the source language text fragment to generate output hypotheses.

13. The method of claim 11 wherein applying a bilingual grammatical element assignment model comprises:

applying a statistical bilingual word model configured to assign grammatical elements based on words in the target language text fragment and the source language text fragment; and applying a statistical bilingual syntactic model configured to assign grammatical elements based on syntactic features in the target language text fragment and the source language text fragment.

14. The method of claim 11 wherein applying the one or more statistical machine translation models to assign grammatical elements, comprises:

assigning at least one of function words, case makers and inflections based on the features in the source language text fragment.

15. The method of claim 11, wherein translation metrics related to the selection of grammatical elements includes an indication of whether a given hypothesis is one of the additional output hypotheses.

* * * * *